US008742007B2

(12) United States Patent
Duff

(10) Patent No.: US 8,742,007 B2
(45) Date of Patent: Jun. 3, 2014

(54) COLOR DEVELOPING COLORLESS PRIMER

(75) Inventor: Robert J. Duff, Newark, DE (US)

(73) Assignee: Oatey Co., Cleveland, OH (US)

( * ) Notice: Subject to any disclaimer, the term of this patent is extended or adjusted under 35 U.S.C. 154(b) by 399 days.

(21) Appl. No.: 13/215,399

(22) Filed: Aug. 23, 2011

(65) Prior Publication Data
US 2012/0043020 A1 Feb. 23, 2012

Related U.S. Application Data

(60) Provisional application No. 61/375,998, filed on Aug. 23, 2010.

(51) Int. Cl.
*C08F 214/06* (2006.01)
*C08K 5/13* (2006.01)
*B32B 7/12* (2006.01)
*B01F 17/00* (2006.01)

(52) U.S. Cl.
USPC ....... 524/567; 524/502; 156/327; 106/287.24

(58) Field of Classification Search
CPC ... B29C 65/4895; C08J 5/122; C08J 2327/06; C08J 2355/02; C09J 5/02; C09J 2427/008; C09J 2455/008; B29K 2027/06; B29K 2055/02
USPC ............... 524/502, 567; 156/327; 106/287.24
See application file for complete search history.

(56) References Cited

U.S. PATENT DOCUMENTS

| | | | |
|---|---|---|---|
| 2,161,735 A * | 6/1939 | Allison | ......................... 430/505 |
| 3,658,543 A | 4/1972 | Gerlach, Jr. | |
| 5,073,615 A | 12/1991 | Shen | |
| 5,252,634 A | 10/1993 | Patel | |
| 5,376,717 A | 12/1994 | Patel | |
| 5,416,142 A | 5/1995 | Bush | |
| 5,422,388 A | 6/1995 | Patel | |
| 5,470,894 A | 11/1995 | Patel | |
| 5,495,040 A | 2/1996 | Patel | |
| 6,087,421 A | 7/2000 | Patel | |
| 6,251,571 B1 | 6/2001 | Dessauer | |
| 6,372,821 B1 | 4/2002 | Patel | |
| 6,958,181 B1 * | 10/2005 | Gore | ............................ 428/64.1 |
| 7,838,585 B2 | 11/2010 | Parhar et al. | |
| 2006/0030689 A1 | 2/2006 | Parhar | |
| 2006/0252865 A1 | 11/2006 | Bush | |

* cited by examiner

*Primary Examiner* — William Cheung
(74) *Attorney, Agent, or Firm* — Calfee, Halter & Griswold LLP

(57) ABSTRACT

The intense purple dye normally found in purple primers for use in the adhesive bonding of plastics is replaced with a leuco dye capable developing a visually intense color when activated through contact with the particular plastic being bonded or a complementary solvent cement.

12 Claims, No Drawings

COLOR DEVELOPING COLORLESS PRIMER

CROSS-REFERENCE TO RELATED APPLICATION

This application is based on, and claims priority to, prior U.S. Provisional Patent Application Ser. No. 61/375,998, filed Aug. 23, 2010, the disclosure of which is incorporated herein by reference.

BACKGROUND

Organic solvent based adhesives have been used for many years for joining objects made from PVC (polyvinyl chloride), CPVC (chlorinated polyvinyl chloride), ABS (acrylonitrile-butatdiene-styrene) and other thermoplastics. In use, the organic solvent partially dissolves or at least softens the surfaces to be joined, thereby achieving an intimate bond between these surfaces when the organic solvent evaporates. Normally, a small amount of thermoplastic resin, the same as or similar to the thermoplastic to be joined, is dissolved in the solvent, thereby producing a "solvent cement." Additionally or alternatively, an acrylic resin can be included in the solvent cement, as acrylics adhere well to all three common plastics, i.e., PVC, CPVC and ABS. See, for example, U.S. Pat. No. 5,073,615 and U.S. Pub. App. No. 2006/0252865, the disclosures of which are incorporated herein by reference.

Before applying a solvent cement, the surfaces to be joined are normally bathed with a primer comprising a solvent for the plastic to be bonded. This also partially dissolves or at least softens these surfaces, thereby allowing the solvent cement to penetrate more effectively for producing a better adhesive bond. If desired, these surfaces can be cleaned before application of the primer to remove any dirt and/or grease that might be present, although this is usually unnecessary.

Many building codes require that plastic piping systems made with solvent cements be primed before application of the solvent cement and further that the primer include an intense colorant, usually purple, to facilitate visual confirmation that the primer and solvent cement have been properly applied. Unfortunately, such purple primers often create unsightly stains on unintended surfaces such as floors, countertops, skin, clothing, etc., as a result of the primer spilling and/or falling off the applicator with which it is applied.

SUMMARY OF THE INVENTION

In accordance with this invention, this staining problem is avoided by replacing the intense purple dye or other colorant normally found in purple primers with a leuco dye capable developing a visually intense color when activated through contact with the particular plastic to be bonded and/or by contact with a solvent cement including a developer for the leuco dye.

Thus, this invention in one embodiment provides an essentially colorless primer for use in preparing a plastic object for bonding with a solvent cement, the primer comprising an organic solvent capable of at least partially softening the surfaces of the plastic object to which it is applied and an essentially colorless color-forming chemical in the solvent, the color-forming chemical being capable of being activated by the plastic to which it is applied, by a component in or on this plastic, by ambient conditions to which it is exposed when applied to the plastic, and/or by a developer included in a subsequently applied solvent cement, activation causing the color-forming chemical to develop a visually noticeable color thereby identifying the surfaces of the object to which the primer has been applied.

In addition, this invention in another embodiment provides a primer/solvent cement system for use in bonding a plastic object to another object, the system comprising an essentially colorless primer containing a first organic solvent capable of at least partially softening the surfaces of the plastic object to be bonded, and a solvent cement comprising a second organic solvent and a thermoplastic resin dissolved in the second organic solvent, one of the primer and solvent cement further comprising an essentially colorless color-forming chemical, the other of the primer and the solvent cement further comprising a developer for the color-forming chemical, the color-forming chemical and developer being selected and present in sufficient concentration so that when the solvent cement is applied to a surface previously covered with the primer, the color-forming chemical and the developer combine to develop a visually noticeable color thereby identifying the surfaces of the object to which the primer has been applied.

DETAILED DESCRIPTION

In accordance with this invention, the staining problem normally encountered when conventional purple primers are used is avoided by replacing the intense purple dye found in these primers with a leuco dye or analogue. In another embodiment, a colorless primer/solvent cement system is provided, one of these products containing a leuco dye or analogue and the other product containing a developer for this dye or analogue.

Plastics

This invention will normally be employed in connection with adhesively bonding articles made from PVC (polyvinyl chloride), CPVC (chlorinated polyvinyl chloride) and ABS (acrylonitrile butadiene styrene) plastics. In this context, it will be understood that "PVC," "CPVC," "ABS" and similar designations refer to polymers which can include other monomers in addition to the vinyl chloride, acrylonitrile, butadiene and styrene monomers being specifically referred to. Similarly, "polymer" in the context of this disclosure will be understood to include homopolymers, copolymers, terpolymers, etc. In addition to PVC, CPVC and ABS, this invention is applicable to bonding all other types of plastics capable of being adhesively bonded with solvent cements, as well. Examples include HiPS (high impact polystyrene), SAN (styrene acrylonitrile), acrylics and polyamides.

Primer Base

The primers of this invention are composed of a conventional primer ("primer base") plus a color forming ingredient added thereto. Although the primers of this invention are most easily made by adding the color forming agent to a previously-made primer, where the primer base is composed of a mixture of solvents, the color forming agent can be added to one or more of these solvents before they are combined together to form a completed primer base.

Essentially any primer that has been known, or which becomes known in the future, for use as a primer for the adhesive bonding of plastics can be used as the primer base in making the primers of this invention. Generally speaking, these primer bases are composed of a solvent or solvent mixture which is capable of softening and in some instances at least partially dissolving the surface of the plastic article to which it is applied. Examples include ketones, ethers, esters, amides, carbonates, organic sulfoxides, organic sulfones, organic sulfides, etc. Mixtures of different solvents are common. These compositions are well known and described, for example, in the following patent documents, the disclosures of which are incorporated herein by reference: U.S. 2006/0030689, U.S. 2006/0252865, U.S. Pat. Nos. 6,372,821, 6,087,421, 5,495,040, 5,470.894, 5,422,388, 5,416,142, 5,376,717, 5,252,634 and Ser. No. 12/171,656, filed Jul. 11, 2008.

Organic solvents of particular interest include acetone (ACE), methyl ethyl ketone (MEK) and other low boiling ketones having boiling points less than 80° C., medium boiling ketones having boiling points of about 80 to 130° C. such as diethyl ketone (DEK), methyl propyl ketone (MPK), methyl iso-propyl ketone (MIPK), methyl iso-butyl ketone (MLBK) and methyl n-butyl ketone (MBK), and high boiling ketones having boiling points greater than 130° C. such as methyl amyl ketone, methyl iso-amyl ketone, di-iso-ketone and ethyl amyl ketone. In one embodiment, cyclic ketones such as cyclohexanone (CYH), cyclopentanone, cycloheptanone and isophorone are avoided. Acetone and methyl ethyl ketone are widely available and inexpensive. Mixtures of acetone and methyl ethyl ketone are particularly interesting, especially those in which the weight ratio of MEK to ACE is 10:1-1:5, more typically 5:1-1:5, 3:1-1:3, 2:1-1:2, or even about 1:1.

In addition to ketones, any of the additional solvents that are typically used in solvent cements as described, for example, in the patent documents mentioned above can also be used in this invention depending on the particular plastics and co-solvents involved. For example, esters such as methyl acetate, ethyl acetate, ethyl formate, ethyl propionate, and t-butyl acetate can be used as additional solvents, as can halogenated solvents such as methylene chloride, ethylene dichloride, trichloroethylene, dibasic esters, ethers such as methyl Cellosolve and dioxane, and other liquids such dimethylformamide (DMF) and acyclic pentanones, hexanones and heptanones.

THF (tetrahydrofuran), DMSO (dimethyl sulfoxide), NMP (N-methyl pyrrolidone) and GBL (gamma-butyrolactone) can also be use as additional solvents. Similarly, halogenated solvents such as methylene chloride, ethylene dichloride, and trichloroethylene, chlorobenzene, OXSOL 100 (parachlorobenzotrifluoride), and the like, as well as various aromatic compounds such as toluene, xylene, and the like, can also be used as additional solvents.

When such additional solvents are used, they are usually present in amounts no greater than about 60 wt. %, based on the total weight of solvent present. More typically they are present in amounts no more than about 50, 40, 30, 20 or even 10 wt %, based on the total weight of solvent present. Minimum amounts of at least about 2, 5, 10, 20, 30, 40 and 50 wt. %, based on the total weight of solvent present, are contemplated.

Solvent Cement Base

The solvent cements of this invention are similarly composed of a conventional solvent cement ("solvent cement base") plus a color forming ingredient added thereto. Although the solvent cements of this invention are most easily made by adding the color forming agent to a previously-made solvent cement base, the color forming agent can be added to one or more components of the solvent cement base before they are combined together to form a completed solvent cement base.

Essentially any composition that has been used as, or which becomes known in the future for use as, a solvent cement in the adhesive bonding of plastics can be used for making the solvent cements of this invention. These compositions are also well known in the art and also described, for example, in the above noted patents and publications as well as many other patents, published patent applications and literature references. Generally speaking, these solvent cement bases are composed of a solvent or solvent mixture which is capable of softening or at least partially dissolving the surface of the plastic article to which it is applied plus a thermoplastic polymer which is the same as, or least in the same family as, the plastic to be bonded ("corresponding polymer").

Solvents and solvent mixtures useful for this purpose are generally the same solvents and solvent mixtures which are useful in forming the primer bases, as discussed above. Thermoplastic polymers which are useful as "corresponding polymers" are those which are chemically similar to the plastic to be bonded. So, for example, a solvent cement intended for bonding PVC would contain dissolved PVC, while a solvent cement intended for bonding CPVC or ABS, for example, would contain dissolved CPVC or ABS, respectively.

Examples of ABS polymers that can be used as corresponding resins in solvent cements made in accordance with this invention generally contain at least 6 wt % butadiene, at least about 15 wt % acrylonitrile, and at least about 15 wt. % styrene, substituted styrene or both.

PVC polymers that can be used as corresponding resins in solvent cements of this invention can be any vinyl chloride polymer or copolymer. Vinyl chloride polymers and copolymers are well known in the art. Copolymers of vinyl chloride include, for example, copolymers of vinyl chloride with one or more copolymerizable monomers having at least one terminal $CH_2=C<$ group such as other vinyl halides and vinylidene halides; acrylic acid, esters of acrylic acid such as methyl acrylate, ethyl acrylate, etc.; methacrylic acid; esters of methacrylic acid; nitriles such as acrylonitrile, methacrylonitrile, etc.; acrylamides such as methyl acrylamide, etc.; vinyl ethers such as ethyl vinyl ether; vinyl ketones; vinyl acetate; vinyl pyridine; etc. Copolymers of vinyl chloride may contain up to 50%, or up to 20% of the copolymerizable monomers.

CPVC polymers that can be used as corresponding polymers in the solvent cements of this invention can include CPVC homopolymers and copolymers. CPVC resins useful in this invention may be prepared by chlorination of any of the polyvinyl chloride homopolymers or copolymers discussed above by procedures known to those skilled in the art. CPVC resins available commercially, are generally available as powders, and may contain from about 57% to about 75% by weight of chlorine. CPVC is often the resin of choice where its high heat deflection resistance is desirable such as in hot water piping systems.

The amount of corresponding resin included in a solvent cement depends in part on the particular corresponding resin used and the intended use of the solvent cement. So, for example, the solvent cement bases used to make the inventive solvent cements normally contain about 1 to 60 wt. % corresponding resin. Solvent cement bases containing about 1-30 wt. %, or even about 10-15 wt. %, corresponding resin are especially interesting. Generally speaking, solvent cement bases used to make the solvent cements of this invention will contain at least 5 wt % of the corresponding resin.

In addition to the "corresponding resin," solvent cements bases used in this invention can also include another thermoplastic polymer in addition to the corresponding resins described above. For convenience, such additional thermoplastic polymers are referred to in this disclosure as "additional resins." Examples include acrylic resins, vinyl aromatic polymers, vinyl pyrrolidone polymers, and mixture thereof, all as more thoroughly described in the above-noted U.S. Pat. No. 5,416,142, U.S. 2006/0030689, U.S. 2006/0252865, and Ser. No. 12/171,656.

In addition to "corresponding" and "additional" polymers, the solvent cements of this invention can also include other conventional ingredients. For example, they can contain from 0 to about 4% or even up to 5% by weight of at least one solid particulate inorganic filler. More typically, they may contain about 0.1% or 0.75% by weight up to about 1.5% or 3% or 4% by weight of the solid particulate inorganic filler. The particulate inorganic fillers are inert and are generally included in the solvent cements disclosed here to improve working viscosity and structural strength, and to reduce costs. Specific fillers are described in the above-noted U.S. Pat. No. 5,416,142, U.S. 2006/0030689, U.S. 2006/0252865, and Ser. No. 12/171,656.

Other components that can also be included in the solvent cements of this invention include lubricants, stabilizers, plasticizers, thixotropic agents, polymeric rheology additives and processing aids, etc., as further described in the above noted U.S. Pat. No. 5,416,142, U.S. 2006/0030689, U.S. 2006/0252865, and Ser. No. 12/171,656.

As well appreciated by those skilled in the art, the properties of a solvent cement depend on many factors including the identity and amount of solvents, the monomers, comonomers and molecular weight of the dissolved corresponding resin, the monomers, comonomers and molecular weight of any additional resin included in the cement, as well as the type and amount of any other component that might be present. Those skilled in the art are well aware of these factors and can easily choose an appropriate concentration for the corresponding resin, any additional resin that may also be present, as well as any other ingredient that may be present, by routine experimentation in view of the desired properties of the solvent cement to be produced, including the thermoplastics to be bonded with the adhesive, the desired viscosity of the adhesive, etc.

Color-Forming Chemicals

In accordance with this invention, an essentially-colorless color-forming chemical is used to develop a noticeably intense color when the primer or primer/solvent cement system of this invention is used. In this context, "essentially-colorless" and "noticeably intense color" are relative terms intended to connote a difference in color intensity that is sufficiently great to easily distinguish one from the other, visually. So, for example, where a vibrant dark purple is considered to be the "noticeably intense color," a faint or light purple would qualify as "essentially-colorless" because the vibrant dark purple can be easily distinguished from the faint or light purple, visually. So, a primer exhibiting a faint or light purple color could still be regarded as an "essentially-colorless" primer in accordance with this invention, provided that it is formulated to develop a vibrant dark purple color when used.

In accordance with this invention, the intense purple dye or other colorant normally found in purple primers is replaced with an essentially-colorless color-forming chemical capable developing a noticeably intense color when activated through contact with the particular plastic to be bonded and/or by contact with an complementary solvent cement formulated to cause such activation. Thus, the primers produced by this invention are essentially-colorless. Thus, these primers may have a light color, i.e., a color which is clearly noticeable although not particularly intense, a faint color, i.e., a color which is only barely noticeable, or no color at all, i.e., entirely colorless. Primers which are translucent, essentially-transparent and even fully transparent are also contemplated.

In some embodiments of this invention, the color-forming chemical is included in the primer and selected so that it will be activated by the plastic to which it is applied, a component in or on this plastic, and/or by ambient conditions to which it is exposed when applied to the plastic such as exposure to light, heat or atmospheric oxygen. In other embodiments, this color-forming chemical is selected so that it will be activated by a separate ingredient, a "developer," intentionally included in or on the plastic to be bonded and/or in the solvent cement to be subsequently applied to the plastic for adhesive bonding. In still another embodiment, the color-forming chemical is included in the solvent cement and the developer is included in the primer. In all cases, activation of the color-forming chemical causes this chemical to develop a noticeably intense color, thereby visually indicating where on the surfaces of the plastic it has been applied. This, in turn, allows an inspector to easily confirm that such primers have been properly used by simple visual inspection.

Any essentially-colorless color-forming chemical can be used for this purpose. For convenience, they are occasionally referred to in this document as "precursor dyes." Most commonly, the color-forming chemical used in this invention is a leuco dye. In this context, "leuco dye" refers to a dye which, prior to development, is in a leuco form (substantially colorless or white) and which reacts with an activator to form a colored dye. The color-altering phenomenon of leuco dyes is typically due to a chemical change, such as brought about by exposure to light, through oxidation, or by chemical reaction such as through exposure to a particular reagent such as an oxidant and/or acid functional compound.

For example, the spiro form of an oxazine is a colorless leuco dye. The conjugated system of the oxazine and another aromatic part of the molecule are separated by an $sp^3$-hybridized "spiro" carbon. After protonating a part of the molecule, irradiation with UV light, or introducing another kind of such change, the bond between the spiro carbon and the oxazine interrupts, the ring opens, the Spiro carbon achieves $sp^2$ hybridization and becomes planar, the aromatic group rotates, aligns its π-orbitals with the rest of the molecule, and a conjugated system forms, with ability to absorb photons of visible light, and therefore appear colorful.

Another example of a leuco dye is the crystal violet lactone, which in its lactone form is colorless or slightly yellowish, but in low pH, when it is protonated, it becomes intensely violet. Other examples are phenolphthalein and thymolphthalein, colorless in acidic to neutral pH, but becoming pink and blue in alkaline environment. Other example are many redox indicators, which undergo reversible color change between colored and colorless form at a specific electrode potential.

Specific leuco dyes suitable for use in the present invention include almost any known leuco dye. Suitable leuco dyes include, but are not limited to, fluorans, phthalides, aminotriarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2,3-dihydroanthraquinones, tetrahalo-p,p'-biphenols, 2(p-hydroxyphenyl) 4,5-diphenylimidazoles, phenethylanilines, and mixtures thereof. In one aspect of the present invention, the leuco dye can be a fluoran, phthalide, aminotriarylmethane, or mixture thereof. Several non-limiting examples of suitable fluoran based leuco dyes include 3-diethylamino-6-methyl-7-anilinofluorane, 3-(N-ethyl-p-toluidino)-6-methyl-7-anilinofluorane, 3-(N-ethyl-N-isoamylamino)-6-methyl-7-anilinofluorane, 3-diethylamino-6-methyl-7-(o,p-dimethylanilino) fluorane, 3-pyrrolidino-6-methyl-7-anilinofluorane, 3-piperidino-6-methyl-7-anilinofluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-anilinofluorane, 3-dibutylamino-7-(o-chloroanilino)fluorane, 3-diethylamino-7-(o-chloroanilino) fluorane, 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1 (3H)-isobenzofuranone,4,5,6,7-tetrachloro-3,3-bis[2-[4-(dimethylamino)phenyl]-2-(4-methoxyphenyl)ethenyl], and mixtures thereof. Aminotriarylmethane leuco dyes can also be used in the present invention such as tris(N,N-dimethylaminophenyl) methane (LCV); deutero-tis(N,N-dimethylaminophenyl) methane (D-LCV); tri s(N,N-diethylaminophenyl) methane (LECV); deutero-tris(4-diethylaminolphenyl) methane (D-LECV); tris(N,N-di-n-propylaminophenyl) methane (LPCV); tris(N,N-di-n-butylaminophenyl) methane (LBCV); bis(4-diethylaminophenyl)-(4-diethylamino-2-methyl-phenyl) methane (LV-1); bis(4-diethylamino-2-methylphenyl)-(4-diethylamino-phenyl) methane (LV-2); tris(4-diethylamino-2-methylphenyl) methane (LV-3); deutero-bis(4-diethylaminophenyl)-(4-diethylamino-2-methylphenyl) methane (D-LV-1); deutero-bis(4-diethylamino-2-methylphenyl)(4-diethylaminophenyl) methane (D-LV-2); bis(4-diethylamino-2-methylphenyl)(3,4-dimethoxyphenyl) methane (LB-8); aminotriarylmethane leuco dyes having different alkyl substituents bonded to the amino moieties wherein each alkyl group is independently selected from C1-C4 alkyl; and aminotriaryl methane leuco dyes with any of the preceding named structures that are further substituted with one or more alkyl groups on the aryl rings wherein the latter alkyl groups are independently selected from C1-C3 alkyl. Other leuco dyes can also be used in connection with the present invention and are known to those skilled in the art. A more detailed discussion of some of these types of leuco dyes may be found in U.S. Pat. Nos. 3,658,543, 6,251,571, 6,958,181, 7,270,865 and 7,329,630, the disclosures of which are incorporated herein by reference.

Other examples of suitable leuco dyes can be found in U.S. Pat. Nos. 6,124,377, 5,476,830, 7,122,247, WO 2007/123966 and WO 2008/0113862, the disclosures of which are also incorporated herein by reference, and may include: diarylphthalide dyes, fluoran dyes, indolyphthalide dyes, acyl-lueocoazine dyes, leucoauramine dyes, spiropyrane dyes, rhodaminelactam dyes, triarylmethane dyes and chromene dyes and combinations thereof. Preferred leuco dyes include, but are not limited to, Spiro(12H-benzo(a)xanthene-12/1$^1$ (3'H)-isobenzofuran-3'-one,9-(diethylamino) (such as COPIKEM® 747), 3-[Butyl-2-methylindol-3-yl]-3-(1-octyl-2-methylindol-3-yl)-1(3H)isobenzof uranone (such a COPIKEM® 35 magenta), 2-'phenylamino-3'-methyl-6'-(dibutylamino) spiro[isobenzofuran-1(3H),9'-(9H)-xanthen]-3-one (such as COPIKEM® 34 Black), substituted Phthalide (such as COPIKEM® 14 Orange), such as COPIKEM® 7 Grape, 2'Di(phenylmethyl)amino-6'(diethylamino)spiro(isobenzofuran-1(3H),9$^1$-(9H)xanthen)-3-one (such as COPIKEM® 5 green). Products identified under the COPIKEM®, PERGASCRIPT® and HODOGAYA® trademarks are commercially available from the Hilton Davis-Company, Cincinnati, Ohio, Ciba Specialty Chemicals Corporation, High Point, N.C., and Hodogaya Chemical Company, Japan, respectively.

Although a wide range of concentrations for the color-forming chemicals are suitable for use in the present invention, concentrations of at least about 0.001 wt. % to 5 wt. % or more are useful. Concentrations on the order of 0.01 wt. % to 0.5 wt. %, 0.02 to 0.2 wt. % and 0.03 to 0.1 wt. % are more typical. These ranges are only exemplary and other weight ranges can be used, depending on the desired image characteristics and other considerations.

Developers

As indicated above, the transformation of a leuco dye or other color-forming chemical from its essentially-colorless state to its colored state occurs through activation by exposure to heat, light or contact with a suitable reagent ("developer") such as an oxidant, acid-functional compound or the like. Normally, the leuco dye or other color-forming chemical of this invention will be included in the inventive essentially-colorless primer. If the particular color-forming chemical selected for this purpose is activated by light or heat, then no developer is required. On the other hand, if the particular color-forming chemical used requires a developer for activation, then this developer must also be brought into contact with the primer when, or after, the primer is applied to the plastic surface to be bonded. This can be done in a variety of ways such as by applying the developer to the plastic surface to be bonded before the primer is applied, by including the developer in the solvent cement to be subsequently used for adhesive bonding and/or by including the developer in the plastic to bonded when the plastic is made. In those embodiments of this invention in which the the leuco dye or other color-forming chemical is included in the inventive solvent cement, the developer can be included in the inventive primer.

Any compound or composition now known, or which later comes to be known, to function as a developer for the leuco dyes or other color-forming chemicals used in this invention can also be used as the developers of this invention. Specific examples include simple acids such as acetic acid, 2,4-pentanedione and HCl, simple oxidants such as ketones and DMSO (dimethyl sulfoxide) as well as more complicated products such as acid-functional organic resins specifically designed for use as leuco dye developers. So, for example, the line of Carbonless Developers available from Schenectaday International, Inc. of Schenectaday, N.Y., under the "HRJ" designation can be used for this purpose. Examples include HRJ-2053 which is a thermoplastic, modified alkyphenolic resin available in flake form, HRJ-14508 which is a zinc salicylate type resin available in aqueous suspension, HRJ-4023 which is a thermoplastic, modified alkyphenolic resin available in aqueuous suspension, and HRJ-2053 which is another thermoplastic, modified alkyphenolic resin available in flake form.

The amount of developer to be used should be sufficient to fully activate the leuco dye or other color-forming chemical being used and depends in large part on how the developer is applied. For example, where an acid-functional resin such as the HRJ line of leuco dye developers mentioned above are included in a solvent cement made in accordance with this invention, the concentration of the developer can be as low as 0.05 wt. % or less and as high as 5.0 wt. % or higher. Concentration levels on the order of 0.1 wt. % to 2 wt. %, or even 0.3 wt. % to 1 wt. % are more common.

Other Ingredients

As well known in the art, some leuco dye systems use developers which must be "activated" for use such as by heat, pressure, or contact with another reagent (an "activator"). See, the above-noted U.S. Pat. Nos. 7,270,865 and 7,329,630. Such "blocked" developers can also be used in the inventive primers and solvent cements, if desired. If so, both the blocked developer and the leuco dye can be included in the same composition, i.e., the primer or the solvent cement, with the activator being included in the other composition. So, for example, both the leuco dye and the blocked developer can be included in the inventive primer, with the activator being included in the inventive solvent cement. Conversely, both the leuco dye and the blocked developer can be included in the inventive solvent cement, with the activator being included in the inventive primer. Or, the blocked developer and the leuco dye can be included in either the inventive primer or inventive solvent cement and the leuco dye included in the other.

In addition to these components, the inventive primer and solvent cement can also include other ingredients normally included in compositions containing leuco dyes or other color-forming chemicals and developers therefor, provided that such additional ingredients do not make the resultant compositions unsuitable for use as primers and solvent cements, as the case may be. That is to say, while it is believed that compositions containing both leuco dye precursors and organic solvents, as well as compositions containing both leuco dye developers and organic solvents, may already be known, such compositions are believed to contain additional ingredients which would make them unsuitable for use as primers and/or solvent cements, because these additional ingredients would adversely affect the bond strength achieved if these compositions were used in solvent cementing applications.

Accordingly, it will be appreciated that the inventive primer and solvent cement are desirably essentially free of such adverse ingredients. In this context, an "adverse ingredient" will be understood as referring to an ingredient whose effect is to reduce the bond strength obtained when a primer or solvent cement containing that adverse ingredient is used in a solvent cementing application. In addition, a primer which is "essentially free of adverse ingredients" will be understood as referring to a primer optionally containing one or more of such adverse ingredient in which the total amount of such adverse ingredients in the primer is insufficient to reduce the bond strength produced when using that primer in a solvent cement bonding application by more than 50% relative to an otherwise identical primer used in the same application in which such adverse ingredients are completely absent. In the same way, a solvent cement which is "essentially free of adverse ingredients" will be understood as referring to a solvent cement optionally containing one or more of such adverse ingredient in which the total amount of such adverse ingredients in the primer is insufficient to reduce the bond strength produced when using that primer in a solvent cement bonding application by more than 50% relative to an otherwise identical solvent cement used in the same application in which such adverse ingredients are completely absent. Normally, the amount of additional ingredients in the inventive primer which adversely affect its bond strength, if any, will be insufficient to reduce this bond strength by more than 25%. Similarly, the amount of additional ingredients in the inventive solvent cement which adversely affect its bond strength, if any, will normally be insufficient to reduce this bond strength by more than 25%.

One example of an additional ingredient that can be included in the inventive primer as well as the inventive solvent cement without significant adverse effect on bond strength is an antioxidant for preventing the dye precursor from changing color prematurely and/or the developer from reacting prematurely. Any suitable antioxidant can be used for this purpose, examples of which include butylated hydroxytoluene, triphenol phosphite and 2,4-di-t-butyl phenyl phosphite. Another example of an additional ingredient that can be included in the inventive primer as well as the inventive solvent cement without significant adverse effect on bond strength is a buffer for maintaining ingredient stability if primer or solvent cement, as the case may be, is inadvertently contacted with an unintended surface (e.g., by being dropped on the floor or carpet) or subjected to washing conditions. Examples of suitable buffers include various tertiary amines such as triethyl amine, trihexylamine, trioctylamine and the like. Still another example of an additional ingredient that can be included in the inventive primer as well as the inventive solvent cement without significant adverse effect on bond strength is a surfactant to prevent binding of these compositions to unintended surfaces as well as to promote in-container stability. Cationic, anionic, nonionic and amphoteric surfactants can be used for this purpose. Specific examples of suitable surfactants include Sulfonyl 104A, which is an acetylenic glycol surfactant available from Air Products, and Dynol 604, which as a low-VOC, low foam, nonionic wetting agent, also available from Air Products.

WORKING EXAMPLES

In order to more thoroughly describe this invention, the following working examples are provided. In these examples, the essentially-colorless primers and solvent cements made in accordance with this invention were used to bond Schedule 40 PVC pipe to associated PVC fittings, except that in one example Schedule 80 CPVC pipe and fitting were bonded. Eight different primers and five different solvent cements were used.

Each essentially-colorless primer was composed of a particular precursor dye and other conventional ingredients added to a conventional "Clear Primer" base composed of MEK and ACE. Five different leuco dyes were used.

Each solvent cement was composed of a conventional solvent cement and a particular leuco dye developer resin, i.e., HRJ-2053, which is a modified alkyl phenol thermoplastic resin in flake form available from Schenectady International. Three different conventional solvent cements were used for this purpose, a Regular Duty PVC Solvent Cement, a Medium Duty PVC Solvent Cement, and a Medium Duty CPVC Solvent Cement available from Oatey Company of Cleveland, Ohio.

The identity, function and source of each chemical used in these working examples is set forth in the following Table 1, while the compositions of the primers used in these working examples is set forth in the following Table 2 and the compositions of the solvent cements used in these working examples is set forth in the following Table 3.

TABLE 1

Identity, Function and Source of Chemicals

| Component | Description | Source |
|---|---|---|
| Clear Primer | Primer | Oatey Co. |
| Regular Duty PVC Cement | PVC Cement | Oatey Co. |
| Medium Duty CPVC Cement | CPVC Cement | Oatey Co. |
| Medium Duty PVC Cement | PVC Cement | Oatey Co. |
| BHT | Antioxidant | Aldrich |
| Trihexylamine | Buffer | Aldrich |
| Trioctylamine | Buffer | Aldrich |
| Triethylamine | Buffer | Aldrich |
| Surfonyl 104A | Surfactant | Air Products |
| Dynol 604 | Surfactant | Air Products |
| Specialty Grape #7 | Precursor dye | Emerald Performance Materials |
| Crystal Violet Lactone | Precursor dye | Emerald Performance Materials |
| HRJ-2053 | Developer Resin | SI Group |
| Specialty Cyan 39 | Precursor dye | Emerald Performance Materials |
| Specialty Red 747 | Precursor dye | Emerald Performance Materials |
| Specialty Orange 14 | Precursor dye | Emerald Performance Materials |

TABLE 2

Primer Compositions, Wt. %

| Ingredients | Primers | | | | | | | |
|---|---|---|---|---|---|---|---|---|
| | 1 | 2 | 3 | 4 | 5 | 6 | 7 | 8 |
| Clear Primer | 97.287 | 99.05 | 99.665 | 97.2 | 96.94 | 96.9 | 96.996 | 95.933 |
| BHT (Antioxidant) | 0.99 | 0.54 | 0.21 | 1.0 | 0.99 | 0.99 | 0.99 | 0.989 |
| Trihexylamine (Buffer) | 0.0198 | 0.07 | — | 0.02 | 0.1988 | 0.1988 | 0.1988 | 0.1978 |
| Trioctylamine (Buffer) | 0.0198 | — | — | — | — | — | — | — |
| Triethylamine (Buffer) | — | 0.07 | 0.075 | 0.002 | 0.1988 | 0.1988 | 0.1988 | 0.1978 |
| Surfonyl 104 A (Surfactant) | 0.66 | 0.12 | — | 0.72 | 0.599 | 0.599 | 0.599 | 0.5934 |
| Dynol 604 (Surfactant) | 0.99 | 0.17 | — | 1.0 | 0.99 | 0.99 | 0.99 | 0.989 |
| Specialty Grape #7 (Precursor dye) | 0.033 | 0.1 | 0.05 | — | — | — | — | — |
| Crystal Violet Lactone (Precursor dye) | — | — | — | 0.099 | — | — | — | — |
| Specialty Cyan 39 (Precursor dye) | — | — | — | — | 0.0634 | — | — | 0.554 |
| Specialty Red 747 (Precursor dye) | — | — | — | — | — | 0.085 | — | 0.524 |
| Specialty Orange 14 (Precursor dye) | — | — | — | — | — | — | 0.061 | — |

TABLE 3

Solvent Cement Compositions, Wt. %

| Ingredients | | Solvent Cement | | | | |
|---|---|---|---|---|---|---|
| Component | Function | A | B | C | D | E |
| Regular Duty PVC Cement | PVC Cement | 99.5 | — | 99 | — | 98 |
| Medium Duty PVC Cement | PVC Cement | — | — | — | 99 | — |
| Medium Duty CPVC Cement | CPVC Cement | — | 99.5 | — | — | — |
| HRJ-2053 | Developer Resin | 0.5 | 0.5 | 1.0 | 1.0 | 2.0 |

These primers and solvent cements were then used to adhesively bond plastic pipe and associated fittings together in a conventional manner by using an insoluble polyester dauber to thoroughly bath the surfaces to be bonded with the inventive primer followed immediately by liberally covering each primed surface with a layer of solvent cement, again with a polyester dauber. The pipe and fitting were then joined and held in place for approximately 30 seconds to allow the joint to set. Visual inspections of the pipe were made immediately after the primer was applied, approximately 15 minutes after each pipe and fitting were bonded and from time to time thereafter. Schedule 40 PVC pipe and associated PVC fittings were used in all examples, except that a Schedule 80 CPVC pipe and associate fitting was used in Example 2.

The following results were obtained:

TABLE 4

Results

| Combinations | | | Color Development | | |
|---|---|---|---|---|---|
| Ex | Primer | Cement | Initial | 15 min | Comments |
| 1 | 1 | A | faint tint | purple | full color overnight |
| 2 | 1 | B | light purple | dark purple | turned purple without developer |
| 3 | 1 | C | light purple | dark purple | full color within hours |
| 4 | 2 | D | medium purple | dark purple | full color within hours |
| 5 | 3 | A | dark purple | dark purple | full color within hours |
| 6 | 3 | A | dark purple | dark purple | full color within hours |
| 7 | 3 | D | light purple | dark purple | full color within 15 minutes |
| 8 | 4 | D | none | light blue | full color within hours |
| 9 | 5 | E | none | faint blue | full color overnight |
| 10 | 6 | E | light red | darker red | full color overnight |
| 11 | 7 | E | light orange | darker orange | full color overnight |
| 12 | 8 | E | dark red | bluish darker red | full color overnight |

In addition to the above results, it was also noticed that the undeveloped portions of the applied primer, i.e., the plastic surfaces carrying dried primer that had not been contacted with solvent cement, were fluorescent in response to UV light.

The above results show that the inventive primers and solvent cements, when used together, develop colors which are sufficiently intense to enable visual confirmation that the primer and solvent cement have been properly applied, even though the primer was essentially colorless prior to use.

Although only a few embodiments of this invention have been described above, it should be appreciated that many modifications can be made without departing from the spirit and scope of the invention. For example, although the above description has focused on using leuco dye precursors and developers for creating the intense purple color normally found in solvent cement primers used in plastic plumbing applications, any other dye/developer system which will develop this intense purple color, as well as any other color useful in plumbing applications, can be used according to the principles of this invention. In addition, the color developing colorless compositions of this invention can also be used in any other application where color is used as an indicator for signaling that a workpiece has been duly treated. All should modifications are intended to be included within the scope of this invention, which is to be limited only by the following claims.

The invention claimed is:

1. A primer/solvent cement system for use in bonding a plastic object to another object, the system comprising
    an essentially colorless primer containing a first organic solvent capable of at least partially softening the surfaces of the plastic object to be bonded, and
    a solvent cement comprising a second organic solvent and a thermoplastic resin dissolved in the second organic solvent,
    one of the primer and solvent cement further comprising an essentially colorless color-forming chemical, the other of the primer and the solvent cement further comprising a developer for the color-forming chemical, the color-forming chemical and developer being selected and present in sufficient concentration so that when the solvent cement is applied to a surface previously covered with the primer, the color-forming chemical and the developer combine to develop a visually noticeable color thereby identifying the surfaces of the object to which the primer has been applied.

2. The system of claim 1, wherein the primer is essentially transparent.

3. The system of claim 1, wherein the plastic object is made from PVC, CPVC or ABS.

4. The system of claim 3, wherein the color-forming chemical is a leuco dye and the developer is an oxidant or an acid-functional compound.

5. The system of claim 4, wherein the developer is an acid-functional compound.

6. The system of claim 4, wherein the acid-functional compound is an acid functional resin.

7. The system of claim 1, wherein the color-forming chemical is in the primer and the developer is in the solvent cement.

8. The system of claim 1, wherein the color-forming chemical is in the solvent cement and the developer is in the primer.

9. The system of claim 1, wherein the first organic solvent and the second organic solvent are different from one another.

10. The system of claim 1, wherein the first organic solvent and the second organic solvent are the same.

11. The system of claim 1, wherein the color-forming chemical and developer are selected so that the color-forming chemical develops an intense, noticeable color when contacted with the developer.

12. A primer/solvent cement system for use in bonding a plastic object to another object, the system comprising
    an essentially colorless primer containing a first organic solvent capable of at least partially softening the surfaces of the plastic object to be bonded, and
    a solvent cement comprising a second organic solvent and a thermoplastic resin dissolved in the second organic solvent,
    one of the primer and solvent cement further comprising an essentially colorless color-forming chemical and a blocked developer capable of causing the color-forming chemical to develop a visually noticeable color when the blocked developer is unblocked, the other of the primer and the solvent cement further comprising an activator capable of unblocking the blocked developer, the color-forming chemical, blocked developer and activator being selected and present in sufficient concentrations so that when the solvent cement is applied to a surface previously covered with the primer, the color-forming chemical, blocked developer and activator combine to develop a visually noticeable color thereby identifying the surfaces of the object to which the primer has been applied.

* * * * *